July 11, 1950
A. E. HIRSCHLER
2,514,580
SEPARATION OF HYDROCARBONS
Filed April 14, 1948
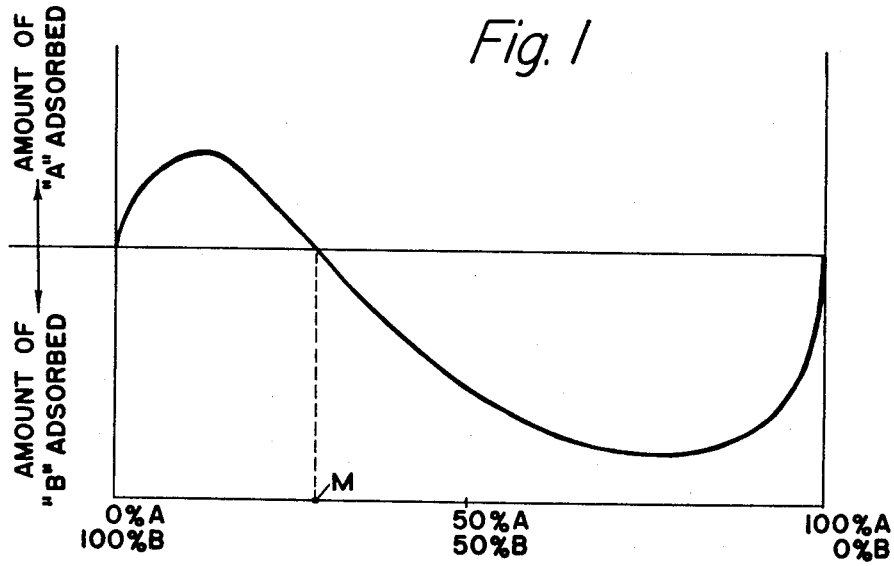
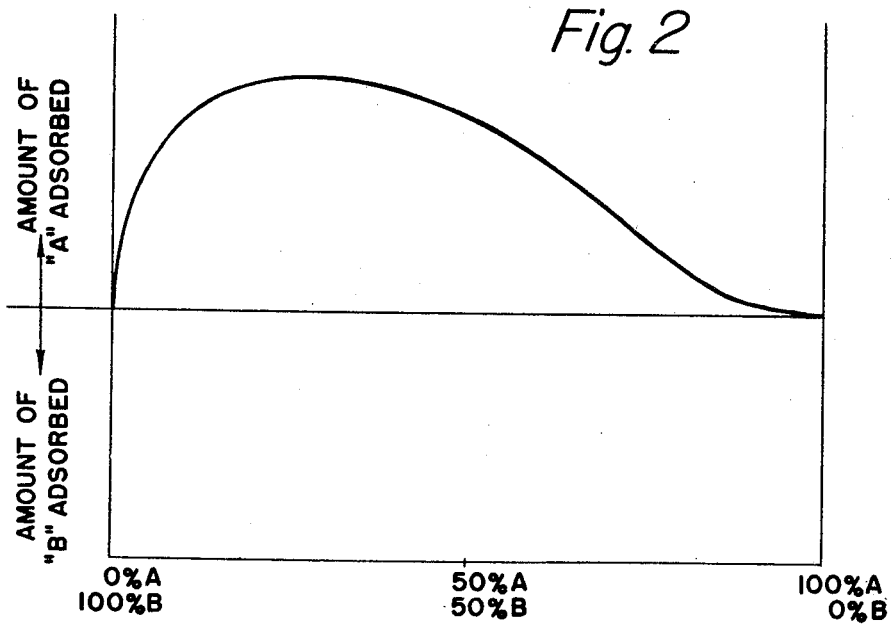
INVENTOR.
ALFRED E. HIRSCHLER
BY
ATTORNEYS Patented July 11, 1950

2,514,580

UNITED STATES PATENT OFFICE 2,514,580

SEPARATION OF HYDROCARBONS

Alfred E. Hirschler, Drexel Hill, Pa., assignor to Sun Oil Company, Philadelphia, Pa., a corporation of New Jersey Application April 14, 1948, Serial No. 20,884

14 Claims. (Cl. 260—666)

This invention relates to a method of separating hydrocarbons having the same degree of saturation by selective adsorption on a granular adsorbent material. The invention is especially directed to an improved method for effecting separation of such hydrocarbons where the starting mixture is such that the adsorbabilities of the constituents are not sufficiently different to permit effective separation when the mixture is treated directly with the adsorbent.

It is well known that hydrocarbons which have different degrees of saturation, as measured by the number of double bonds per molecule, may be separated by selective adsorption on various granular adsorbent materials. Silica gel and activated carbon are known to be among the most efficient adsorbents for making such separations. For example, it is known that the aromatics are more strongly adsorbed by such adsorbents than olefins, and that the olefins are more strongly adsorbed than saturated hydrocarbons, i. e., naphthenes and paraffins.

More recently, I have found that hydrocarbons which have the same degree of saturation nevertheless have adsorbabilities that are sufficiently different under most conditions that they may be effectively separated by means of an adsorbent such as silica gel or activated carbon. This procedure of separation may be applied to mixtures such as the following, each of which is composed of constituents having the same degree of saturation: a paraffin and a paraffin; a naphthene and a naphthene; a paraffin and a naphthene; an olefin and an olefin; and an aromatic and an aromatic. Methods of effecting such separations are described and claimed in my co-pending applications as follows: Serial Nos. 643,762, now abandoned, 643,763 (now Patent No. 2,448,488) and 643,764, (now Patent No. 2,464,931), all filed January 26, 1946; Serial No. 660,076, filed April 6, 1946, now abandoned; Serial No. 792,517, filed December 18, 1947, now abandoned; Serial Nos. 672,683 and 672,684, now abandoned, 672,685, now Patent No. 2,480,242, and 672,686, all filed May 27, 1946; and Serial No. 747,277, filed May 10, 1947.

Mixtures of hydrocarbons having the same degree of saturation, as above named, exhibit adsorption behaviors which may be classified in two general types. One type occurs where, at a given temperature, one of the components is selectively adsorbed from the mixture throughout a portion of the concentration range while the other component is selectively adsorbed throughout the remainder of the concentration range. In other words mixtures of this type exhibit what is referred to as an S-type adsorption isotherm, and there is one certain proportion of the constituents at which the adsorbabilities theoretically are the same. With a mixture which sufficiently approximates this proportion, the components will not be separated to any useful or substantial degree when the mixture is directly treated with the adsorbent.

The other type of mixture occurs where one of the hydrocarbons is the more adsorbable component throughout the whole concentration range. With this type of mixture, a separation will always be effected upon treating the mixture with the adsorbent regardless of the proportions of the constituents. However, the degree of separation with mixtures of this type will not in all cases be sufficient to warrant commercial practice of the process. While some such mixtures will give a useful degree of separation at all proportions of the constituents, others will not where one of the constituents is present in the starting mixture in small amount.

There are therefore certain conditions, depending upon the particular hydrocarbons in the starting mixture and their proportions, at which a substantial or effective separation will not be obtained when the starting mixture is treated directly with the adsorbent. The present invention is directed to a method for improving the separation in such cases. I have discovered that by adding a third hydrocarbon to such a starting mixture the adsorbabilities of the starting components will be changed relative to each other so that a substantial separation may then be effected. Accordingly, the present process comprises first adding a third hydrocarbon to the starting mixture and then treating the resulting mixture in liquid phase with the adsorbent to selectively adsorb one of the starting components and thereby effect a substantial separation.

The hydrocarbon which is added to the starting mixture should be one which contains not more than one double bond per molecule more than the starting hydrocarbons. This is in order that the adsorbability of the added hydrocarbon will not be too much greater than the adsorbabilities of the starting components. If the difference in adsorbabilities is too great, addition of the third hydrocarbon will decrease the affinity of the adsorbent for the starting hydrocarbons to an undesirable extent. Preferably, a saturate hydrocarbon is used as the additive regardless of the degree of saturation of the starting hydrocarbons. However, if desired, a hydrocarbon which has the same degree of saturation as the starting components may also be used even where the starting hydrocarbons are olefins or aromatics. As previously indicated any hydrocarbon which contains not more than one double bond per molecule more than the starting hydrocarbons will be effective to shift the relative adsorbabilities of the components.

It is also preferred to use as the additive a hydrocarbon which has a boiling point substantially different from the boiling points of the starting components, so that the added hydrocarbon may be readily separated from the fractions obtained from the operation. The added hydrocarbon may boil either below or above both of the starting hydrocarbons. After it is recovered from the product fractions, it may be recycled for further use in the process if desired.

The accompanying drawings are schematic illustrations of the types of behavior of hydrocarbon pairs as discussed above. The drawings depict the types of adsorption isotherms, for the complete composition range of 0 to 100% for each component, obtained for hydrocarbon pairs which have the same degree of saturation. As is well known, the adsorption isotherm shows the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 1 is representative of the type of adsorption isotherm obtained where one of the components is selectively adsorbed over part of the concentration range and the other component is selectively adsorbed over the remainder of the range. This is known as an S-type isotherm. Figure 2 illustrates the adsorption isotherm where one of the components is selectively adsorbable throughout the whole concentration range. This is known as a U-type isotherm.

With the type of behavior as shown in Figure 1, component A is selectively adsorbable from any mixture of the hydrocarbons, A and B, which has a composition lying between 0% A and that represented by point M which is the composition corresponding to the point where the adsorption isotherm crosses the horizontal line. On the other hand, component B is selectively adsorbable from any mixture where the proportion of A is above that represented by point M. Either component may therefore be selectively adsorbed, depending upon which side of point M the starting mixture composition falls. However, if the starting mixture composition sufficiently approximates that represented by point M, the degree of separation upon directly treating the mixture with the adsorbent will not be substantial. In such case the addition of a third hydrocarbon as above specified will have the effect of shifting the proportion of the components corresponding to point M. A separation may then be effected by treating the resulting mixture with the adsorbent. Preferably, this is done by filtering the mixture through a column of the adsorbent. One of the starting components will be selectively adsorbed relative to the other and a filtrate fraction will be obtained which contains the other component in a higher proportion, relative to the component that is selectively adsorbed, than in the starting mixture. The added component which is present in the filtrate fraction may be separated therefrom by distillation, so as to yield said other component in a form which is more nearly pure than the starting mixture. Also, the component which was caused to be selectively adsorbed by the addition of the third hydrocarbon may be obtained in more nearly pure form by displacing the adsorbate from the adsorbent and distilling to separate the added hydrocarbon. As the desorbing agent for this purpose, a polar organic liquid such as alcohol or acetone, or a hydrocarbon such as an aromatic or saturate hydrocarbon, may be employed, the amount required in any case depending on its degree of adsorbability and the particular hydrocarbons in the mixture treated. In many cases, it will be distinctly advantageous to use as the desorbing agent a further amount of the same hydrocarbon which was added to the starting mixture to shift the relative adsorbabilities. This will avoid any necessity of having still another material available for practicing the process.

One example of a hydrocarbon mixture which gives the type of adsorption isotherm shown in Figure 1 is 2,3-dimethylpentane and 2,4-dimethylpentane with silica gel as the adsorbent. The point where the adsorption isotherm crosses the horizontal line occurs when the mixture contains about 29% of the 2,3-compound (similar to Figure 1 with the A component being the 2,3-dimethylpentane). When a mixture containing 27.2% of this component, without any additive, was percolated through a column of silica gel followed by alcohol as a desorbing agent, a small but unsubstantial degree of separation was obtained, the 2,3-compound being preferentially adsorbed to a small extent. When the same mixture was first diluted with isopentane, employing 117 volumes of the isopentane per 100 volumes of the starting mixture, and the resulting mixture was filtered through the column of silica gel, it was found that a 60-fold increase in the degree of separation was effected (as measured by the amount of product containing the less adsorbable component in a proportion higher than in the charge), and in this case the 2,4-compound was preferentially adsorbed. The addition of isopentane thus shifted the relative adsorbabilities sufficiently to permit a substantial separation.

Another example of a mixture having an S-type isotherm is n-dodecane (a paraffin) and dicyclohexyl (a naphthene) with silica gel as the adsorbent. In this case, the components have about the same degree of adsorbability when the n-dodecane content is 56.5%, this proportion being equivalent to point M in Figure 1. It was found that when cyclopentane was added to the mixture in an equal proporation, the relative adsorbabilities shifted so that point M occurred at about 66% n-dodecane. On the other hand, when isopentane was added in an equal proportion, the dicyclohexyl was caused to be the more adsorbable component throughout the whole concentration range. In other words the adsorption isotherm changed from the S-type to the U-type.

These results illustrate the fact that where the starting mixture is composed of a naphthene and a paraffin which form an S-type system with silica gel, addition of a napthene to the mixture generally will increase the adsorbability of the paraffin relative to the starting naphthene, whereas the addition of a paraffin to the starting mixture generally will cause the adsorbability of the naphthene to increase relative to the starting paraffin. Either component may therefore be made the more adsorbable so as to be obtainable in lowest concentration in the first portion of the filtrate, dependent upon which type of additive is employed.

A further specific example of a mixture having an S-type isotherm is one composed of isooctane (2,2,4-trimethylpentane) and methylcyclohexane with silica gel as the adsorbent. Such a mixture containing about 21.5% isooctane corresponds to point M in Figure 1. It was found that when such a mixture was diluted with an equal volume of isopentane and the mixture was then filtered through silica gel, the methylcyclohexane was caused to be selectively adsorbed and the first cuts of filtrate product, after removal of isopentane, contained a relatively high proportion of isooctane. A product containing the methylcyclohexane in relatively high proportion could have been obtained as the later portions of filtrate by employing a desorbing agent as described above. This example again shows that addition of a paraffin to a naphthene-paraffin mixture of the S-type with silica gel as the adsorbent generally causes the relative adsorbability of the naphthene to increase.

Still another specific example of the S-type mixture with silica gel is methylcyclohexane and ethylcyclohexane (both naphthenes). A mixture containing about 37% methylcyclohexane corresponds to point M of Figure 1. It was found that the addition of approximately equal volumes of either cyclopentane (a naphthene) or isopentane (a paraffin) caused the methylcyclohexane to be selectively adsorbed, resulting in a substantial separation. The cyclopentane effected a higher degree of improvement than the isopentane.

Figure 2 illustrates the other type of adsorption behavior, wherein the A component is selectively adsorbed from the mixture at all concentrations. As previously stated, some of the mixtures which have this so-called U-type isotherm will be capable of being separated to a substantial extent regardless of the proportion of the components in the mixture. Many others, however, will have an adsorption isotherm such as illustrated in Figure 2, whereby a substantial separation may be obtained by direct treatment with the adsorbent at most concentrations but not where one of the components is present in small amount. Thus, as illustrated in Figure 2, when the mixture contains only a small amount of the B component, say less than about 10%, some separation will be effected but the degree of separation will be so slight as not to be worth-while. Such mixtures may be treated in accordance with the present invention by first adding another hydrocarbon to the mixture to alter the relative adsorbabilities of the starting components. The mixture may then be passed through a body of the adsorbent to obtain an improved degree of separation.

A specific example of the type of system shown in Figure 2 is n-heptane and methylcyclohexane with activated carbon as the adsorbent, the n-heptane corresponding to the A component. When a mixture of these compounds containing 95% n-heptane was filtered through a column of activated carbon, the n-heptane was selectively adsorbed but the degree of separation was small. Dilution with isopentane increased the relative adsorbability of the n-heptane and substantially improved the degree of separation. In this case it will be noted that the addition of a paraffin to a naphthene-paraffin mixture caused the starting paraffin to be more strongly adsorbable.

It will be understood that the specific examples given above are merely illustrative and that all hydrocarbon pairs which have the same degree of saturation will exhibit behaviors with adsorbents such as silica gel or activated carbon which are either of the S-type or U-type. While the invention has been specifically described with reference to the separation of saturate hydrocarbons, the principle upon which the process is based is equally applicable to unsaturated hydrocarbons having the same number of double bonds per molecule, such as an olefin-olefin or an aromatic-aromatic mixture. The effect of adding a third component on the relative adsorbabilities of the hydrocarbons may be considered analogous to the effect on the boiling characteristics of adding a third component to an azeotropic mixture. In the latter case the third component will change the relative vapor pressures of the components out of the mixture so as to permit separation by distillation, while in the present case the third component changes the relative adsorbabilities of the components so as to permit separation by selective adsorption.

This principle is applicable not only when the adsorbent is silica gel or activated carbon but also with other adsorbents which have sufficient adsorptive capacity for hydrocarbons. Silica gel and activated carbon are generally more effective than other known adsorbents, but other adsorbents such as activated alumina, magnesia and various activated clays are also capable of effecting a separation. The present invention is also applicable to separations carried out by such other adsorbents.

When the adsorbent employed is activated carbon and the starting hydrocarbons are saturates, it is preferred to use as the third component a saturate hydrocarbon which boils below the starting components. This is due to the fact that with activated carbon, unlike silica gel, the adsorbability of saturate hydrocarbons tends to increase considerably as the molecular weight increases. If a third component is used which has a boiling point that is much higher than the starting material, the tendency will be to cause a decrease in the adsorptivity of the carbon for the starting components to an undesirable extent.

As previously stated, the preferred procedure in practicing the process comprises percolating the mixture of starting hydrocarbons and the third component through a column of the adsorbent, employing a relatively large amount of adsorbent proportionate to the material to be treated. Where the adsorbent is initially in a dry state and the third component is one which is more strongly adsorbable than the starting hydrocarbons, it is desirable first to add a small amount of the third component separately to the column. This will prevent the charge mixture as it passes through the adsorbent from becoming depleted of the third component by selective adsorption. After addition of the charge to the column, the hydrocarbons may be displaced from the adsorbent by means of a suitable desorbing agent and the filtrate may be collected in a plurality of fractions which will be enriched with respect to one or the other of the starting components. The additive may be recovered from the fractions by distillation and then re-used.

The proportion of additive to use may vary considerably with the particular mixture to be treated and the particular additive employed and cannot be definitely specified for all cases. As a general rule, there will be an optimum proportion for any given case which will give the maximum separation of the starting components. This proportion may readily be determined in any given case by test. It should be noted that the additive need not be a single compound but may be a mixture of compounds such as a mixture of paraffins, a mixture of naphthenes, a mixture containing both paraffins and naphthenes, or a mixture containing the other specified types of hydrocarbons, and that a similar effect in changing the relative adsorbabilities of the starting hydrocarbons will result.

Other modifications are permissible within the broad aspects of the invention.

Having described my invention, what I claim and desire to protect by Letters Patent is:

1. In the separating of a mixture of two hydrocarbons having the same degree of saturation by means of a granular adsorbent, which mixture when treated directly with the adsorbent is not substantially separable due to the fact that the difference between the adsorbabilities of the two constituents is not substantial, the method of improving the separation which comprises first adding to the mixture a third hydrocarbon having not more than one double bond per molecule more than the starting hydrocarbons, then passing the resulting mixture in liquid phase through a body of said adsorbent, thereby selectively adsorbing one of the starting hydrocarbons relative to the other, and separating from the adsorbent a filtrate fraction containing the starting hydrocarbons in a substantially altered proportion.

2. Method according to claim 1 wherein the adsorbent is silica gel.

3. Method according to claim 1 wherein the adsorbent is activated carbon.

4. Method according to claim 1 wherein said third hydrocarbon has a boiling point substantially different from both of the starting hydrocarbons and is separated from said filtrate fraction by distillation.

5. Method according to claim 1 wherein said third hydrocarbon is a saturate hydrocarbon.

6. Method according to claim 1 wherein the starting hydrocarbons and said third hydrocarbon are each saturate hydrocarbons.

7. Method according to claim 6 wherein the adsorbent is silica gel.

8. Method according to claim 6 wherein the adsorbent is activated carbon.

9. Method according to claim 1 wherein the starting hydrocarbons are each paraffins.

10. Method according to claim 9 wherein the third hydrocarbon is a saturate hydrocarbon.

11. Method according to claim 1 wherein the starting hydrocarbons are each naphthenes.

12. Method according to claim 11 wherein the third hydrocarbon is a saturate hydrocarbon.

13. Method according to claim 1 wherein one of the starting hydrocarbons is a paraffin and the other a naphthene.

14. Method according to claim 13 wherein the third hydrocarbon is a saturate hydrocarbon.

ALFRED E. HIRSCHLER.

REFERENCES CITED

The following references are of record in the file of this patent:

UNITED STATES PATENTS

| Number | Name | Date |
|---|---|---|
| 2,395,491 | Mavity | Feb. 26, 1946 |

OTHER REFERENCES

Mair, Jour. Res. Nat. Bur. Stand., vol. 34, 448–451 (1945).

Mair et al., Ind. Eng. Chem., vol. 39, 1072–1078, 1947.

Hirschler et al., Ind. Eng. Chem., vol. 39, 1585–96 (1947).